US009552333B2

(12) United States Patent
Lam

(10) Patent No.: US 9,552,333 B2
(45) Date of Patent: *Jan. 24, 2017

(54) IDENTIFICATION OF MULTIMEDIA CONTENT IN PAGINATED DATA USING METADATA

(71) Applicant: International Business Machines Corporation, Armonk, NY (US)

(72) Inventor: Joseph Lam, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,544

(22) Filed: Sep. 21, 2015

(65) Prior Publication Data

US 2016/0012049 A1 Jan. 14, 2016

Related U.S. Application Data

(63) Continuation of application No. 14/247,503, filed on Apr. 8, 2014.

(51) Int. Cl.
G06F 17/30 (2006.01)
G06F 17/21 (2006.01)

(52) U.S. Cl.
CPC ....... *G06F 17/217* (2013.01); *G06F 17/30011* (2013.01); *G06F 17/30873* (2013.01)

(58) Field of Classification Search
None
See application file for complete search history.

(56) References Cited

U.S. PATENT DOCUMENTS

| 7,299,222 | B1 * | 11/2007 | Hogan | G06F 17/30864 |
| 7,599,931 | B2 | 10/2009 | Shi et al. | |
| 7,933,864 | B1 | 4/2011 | King et al. | |
| 8,317,097 | B2 | 11/2012 | Flake et al. | |
| 8,332,477 | B1 * | 12/2012 | Kaiserlian | H04L 51/16 709/206 |
| 8,392,823 | B1 | 3/2013 | Schneider et al. | |
| 8,489,609 | B1 | 7/2013 | Ong et al. | |
| 2004/0148362 | A1 * | 7/2004 | Friedman | H04L 29/06 709/217 |

(Continued)

FOREIGN PATENT DOCUMENTS

WO 2011116227 A3 9/2011

OTHER PUBLICATIONS

Appendix P—"List of IBM Patents or Patent Applications Treated as Related".

(Continued)

*Primary Examiner* — Richard Bowen
(74) *Attorney, Agent, or Firm* — Isaac J. Gooshaw; Steven L. Fisher-Stawinski

(57) ABSTRACT

One or more processors determine whether a metadata is included in a body of content. In response to a determination that the metadata is included in a body of content, one or more processors determine whether the metadata indicates that multimedia content is included in the body of content. In response a determination that the metadata indicates multimedia content is included in the body of content, one or more processors associate an indicator with a page of the body of content that includes that multimedia content, which indicates that the page includes that multimedia content.

9 Claims, 3 Drawing Sheets

(56) References Cited

U.S. PATENT DOCUMENTS

| | | | |
|---|---|---|---|
| 2007/0116359 A1* | 5/2007 | Ohk | G06K 9/00469 |
| | | | 382/176 |
| 2008/0052742 A1* | 2/2008 | Kopf | H04N 5/44591 |
| | | | 725/34 |
| 2012/0117052 A1 | 5/2012 | Zhang et al. | |
| 2012/0131507 A1* | 5/2012 | Sparandara | G06F 19/322 |
| | | | 715/833 |
| 2012/0192118 A1* | 7/2012 | Migos | G06F 1/1626 |
| | | | 715/863 |
| 2012/0278402 A1* | 11/2012 | Limont | G06Q 10/107 |
| | | | 709/206 |
| 2012/0278403 A1* | 11/2012 | Costenaro | G06F 17/30873 |
| | | | 709/206 |
| 2013/0041961 A1* | 2/2013 | Thrower, III | G06Q 10/10 |
| | | | 709/206 |
| 2013/0138735 A1 | 5/2013 | Kanter et al. | |
| 2014/0118800 A1* | 5/2014 | Hwang | H04N 1/00331 |
| | | | 358/474 |
| 2014/0203999 A1* | 7/2014 | Shim | G06F 3/1454 |
| | | | 345/2.2 |
| 2015/0012855 A1* | 1/2015 | Won | G06F 3/0483 |
| | | | 715/765 |

OTHER PUBLICATIONS

Bergman, Michael K., "Deep Content™ White Paper," The Deep Web: Surfacing Hidden Value, BrightPlanet™, Monday, Sep. 24, 2001, Copyright 2000-2001, BrightPlanet Corp., <http://beta.brightplanet.com/deepcontent/tutorials/DeepWeb/index.asp>.

Jiang et al., "FoCUS: Learning to Crawl Web Forums", WWW 2012—Industrial Track, Apr. 16-20, 2012, Lyon, France, pp. 33-42, ACM 978-1-4503-1230-1/12/04.

U.S. Patent Application, Entitled "Identification of Multimedia Content in Paginated Data Using Metadata", filed Apr. 8, 2014.

* cited by examiner

IDENTIFICATION OF MULTIMEDIA CONTENT IN PAGINATED DATA USING METADATA

BACKGROUND OF THE INVENTION

The present invention relates generally to the field of paginated data, and more particularly to identification of multi-media elements.

An Internet forum, also called a forum, discussion forum or message board, is an online discussion site where people can hold conversations in the form of posted messages. Forums often have a specific set of jargon associated with them; e.g. a single conversation is called a "thread", or topic.

Within a forum's topic, each new discussion started is called a thread. Threads, are the places under which members can start their discussions or posts, which can be replied to by many individuals of varying backgrounds and areas of expertise. Often, a thread is defined by a title, an additional description that may summarize the intended discussion. A thread can contain any number of posts, including multiple posts from the same members, even if they are one after the other.

A post is a user-submitted message included in a thread. Typically, the first post starts the thread; this may be called the TS (thread starter) or OP (original post). Posts that follow a TS in the thread, in general, continue a discussion initiated by the content of the TS, or respond to other replies. Since a large number of participants may be creating posts, a given thread can span an extended period of time and have thousands of entries. To present large threads, the posts of a thread are often paginated, i.e., presented as blocks of posts that are assigned to a given page. These posts can include attachments. An attachment can be almost any file and often include multi-media content such as video, audio or picture files in various formats; which are typically uploaded to the forum's server.

SUMMARY

Embodiments of the present invention provide a method, system, and program product for indicating the presence of multimedia content. One or more processors determine whether a metadata is included in a body of content. Responsive to a determination that the metadata is included in a body of content, one or more processors determine whether the metadata indicates that multimedia content is included in the body of content. Responsive to a determination that the meta data indicates multimedia content is included in the body of content, one or more processors associate an indicator with a page of the body of content that includes that multimedia content, which indicates that the page includes that multimedia content.

DETAILED DESCRIPTION

Embodiments of the present invention recognize that sources of paginated data can be large and therefore require substantial time to review to identify specific content. Embodiments of the present invention recognize that the inclusion of additional indicators can direct a user to specific pages of the paginated data that include specific types of data.

Figure 1:
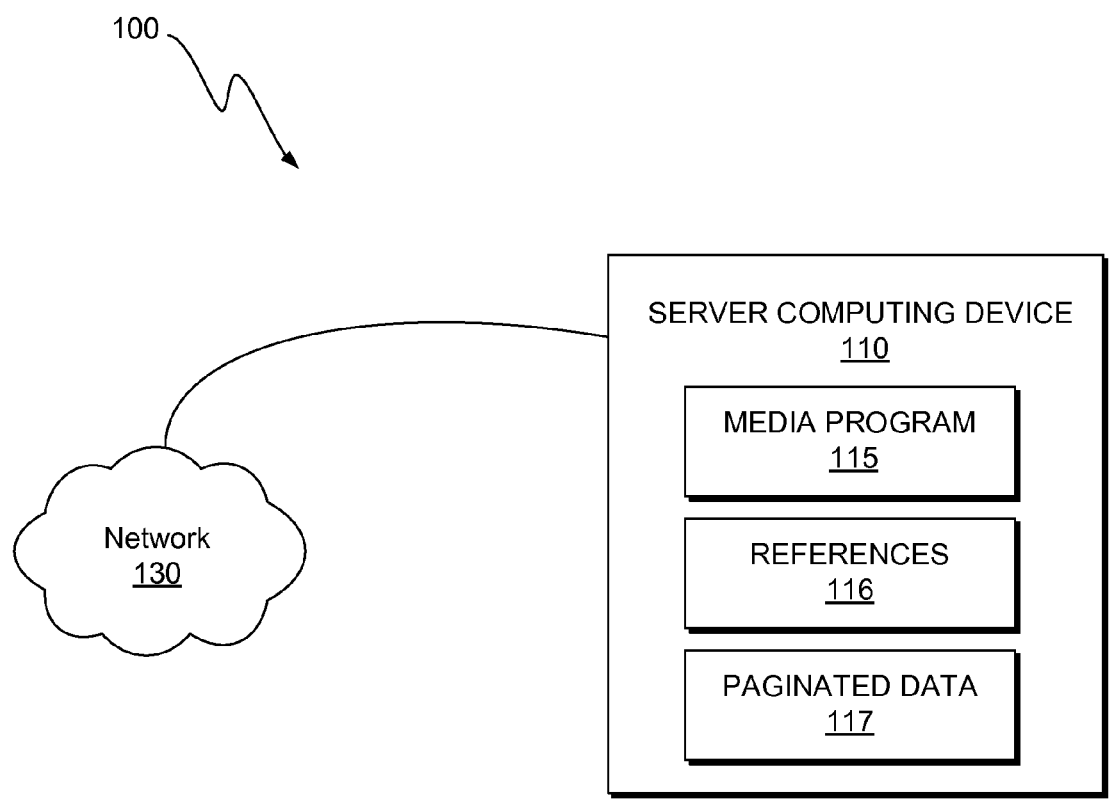
FIG. 1 is a functional block diagram illustrating a paginated data environment, in accordance with an exemplary embodiment of the present invention.

The present invention will now be described in detail with reference to the Figures. FIG. 1 is a functional block diagram illustrating an online data environment, generally designated 100, in accordance with one embodiment of the present invention. Online data environment 100 includes server computing device 110 connected over network 130. Server computing device 110 includes media program 115, references 116 and paginated data 117.

In various embodiments of the present invention, server computing device 110 is a computing device that can be a standalone device, a server, a laptop computer, a tablet computer, a netbook computer, a personal computer (PC), or a desktop computer. In another embodiment, server computing device 110 represents a computing system utilizing clustered computers and components to act as a single pool of seamless resources. In general, server computing device 110 can be any computing device or a combination of devices with access to media program 115, references 116 and paginated data 117 and is capable of executing media program 115. Server computing device 110 may include internal and external hardware components, as depicted and described in further detail with respect to FIG. 3.

In this exemplary embodiment, media program 115 and paginated data 117 are stored on server computing device 110. However, in other embodiments, media program 115, references 116 and paginated data 117 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between server computing device 110, media program 115, references 116 and paginated data 117, in accordance with a desired embodiment of the present invention.

In exemplary embodiments, media program 115 searches the contents of paginated data 117 to identify metadata associated with multimedia content. After the metadata is identified, media program 115 matches the metadata to entries included in references 116. Based on the matches, media program 115 modifies a visual representation of the contents of paginated data 117 such that the location of that the multimedia content, which is associated with the metadata, is indicated. For example, the contents of paginated data 117 includes a discussion forum of a website that allows end users included in a support team of a company to interact with each other, with an ultimate goal of cultivating an online community to help end users with problems related to the software products of the company. The discussion forum is very active, and threads are usually 20-30 pages long, with each page displaying 10 responses each time. These threads are filled with posts between end users, and support engineers, and a lot of threads have useful screen captures and videos that are posted somewhere in the 30 pages of discussion. Media program 115 identifies and indicates the presence of meta-data, such as file types (i.e. video, audio, images) included in the 30 pages and adds an indicator, in this case icons, to a visual representation that is displayed to the users. Using the icons to identify which pages of the thread include multimedia content the forum users are able to quickly identify which pages contain responses that have attached images and videos, without having to manually search through the contents of each page of the 30 pages. In this example, icons are added to the page numbers to indicate the type of multimedia content that is included in the posts included on that particular page. It is to be noted that such indicators, or means of indication, can vary from one embodiment of the invention to another. In general, media program 115 identifies of specific pages in a forum that include multimedia content and conveys that information such that the required time to complete a search for that content is reduced.

In general, media program 115 can be utilized by most data systems that output pages of data/information (i.e. discussion forum, enterprise content management system, information retrieval system, search engines, government websites). Such environments are becoming increasingly prominent as social media, cloud and discussion forums take precedence as key information sharing platforms. As, the number and size of such environments grow, it may become increasingly difficult for users to locate desired information as more time be required to conduct a search.

The premise under which media program 115 operates is that media program 115 surfaces the metadata, i.e., identifies and indicates the presence of meta-data that indicates multimedia content, of paginated information as that information is generated, which allows users of that online information to quickly identify and retrieve specific types of data, such as multimedia content. In certain embodiments, media program 115 surfaces relatively shallow metadata, such as file types (i.e. video, audio, images). In certain embodiments, media program 115 is implemented at a deeper level, such that media program 115 can be used to retrieve and surface deeper metadata (i.e. a length of an audio file and a title of the audio file). In certain embodiments, media program 115 expands outside the realm of web technologies. For example, in the case of a PDF file with 100 pages of information, media program 115 generates a table of contents with the metadata identified beside each page number in the table of contents.

In this exemplary embodiment, paginated data 117 is a database of information that is to be made available as online content, e.g., as internet content, such as forums. As part of the processing activity of media program 115, unprocessed information is organized into pages of information, i.e., the content is paginated, after any included multimedia content has been identified and indicated by media program 115. The processed and paginated data generated by media program 115 is then saved as part of paginated data 117. As such, the information included in paginated data 117 can include both paginated and un-paginated information.

In exemplary embodiments, references 116 includes a set of entries that media program 115 accesses to match with metadata included in posts. A match between the identified metadata and an entry included in references 116 indicates that a link or another type of embedded element of the post includes multimedia content. In general, the entries included in references 116 are updated to ensure that the latest multimedia formats and media types are identifiable by media program 115. As such, in certain embodiments, media program 115 is configured to identify new media formats and media types and add the needed entries to references 116 such that future instances of those media formats or media types will be identified by media program 115.

Figure 2:
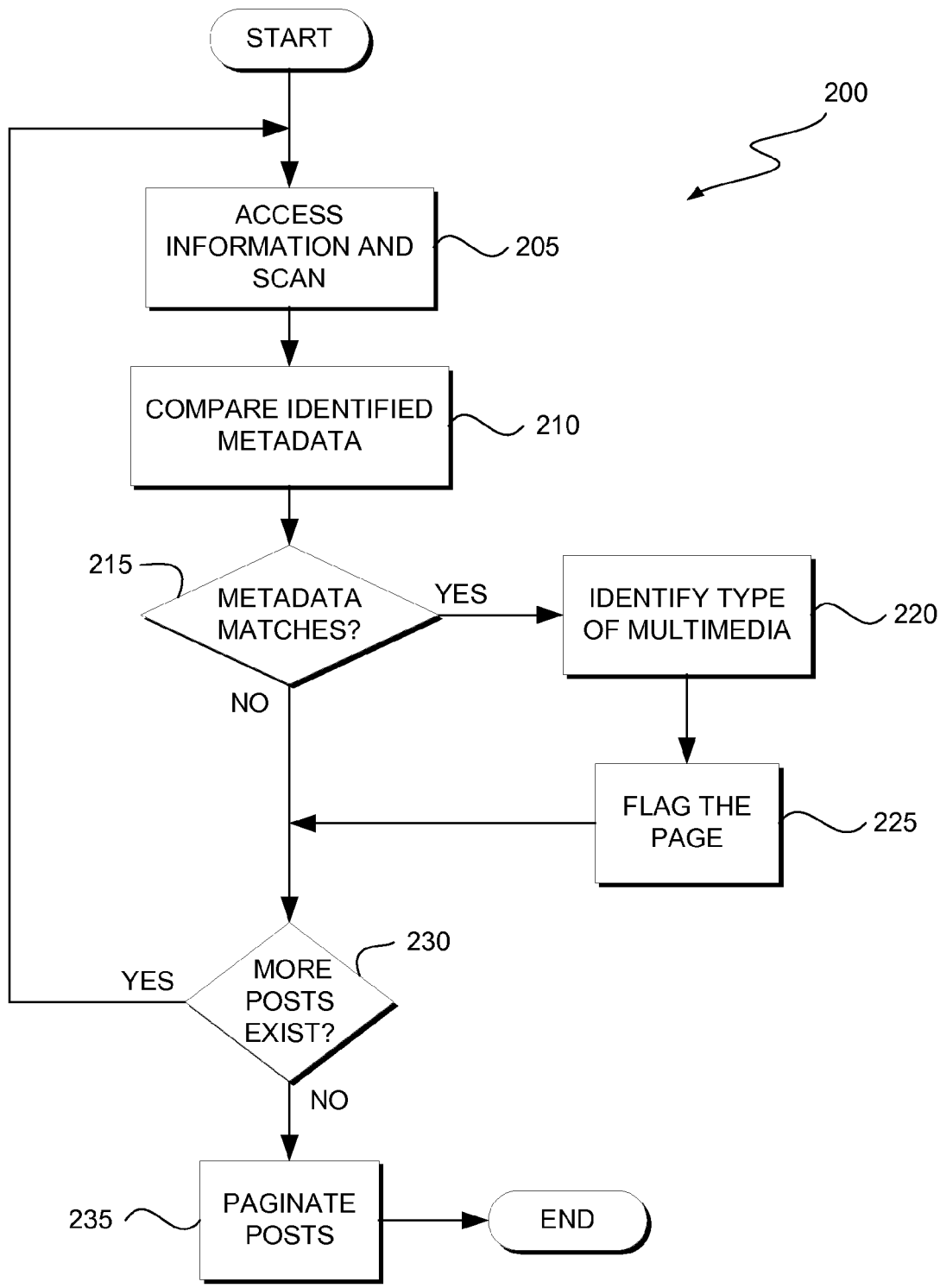
FIG. 2 illustrates operational processes of a media program, executing on a computing device within the environment of FIG. 1, in accordance with an exemplary embodiment of the present invention.

FIG. 2 illustrates operational processes of a media program 115, executing on computing device 110, in accordance with an exemplary embodiment of the present invention.

In process 205, media program 115 accesses the information included in paginated data 117, identifies and scans the contents of a set of posts that have not been processed, which are to be included in a page of paginated data. The scanning identifies the metadata of those posts. For example, assume that pagination occurs every ten posts in a thread of a forum. As such, media program 115 scans the contents of ten posts that will be included in a single page and identifies the included metadata. It should be noted that, in this embodiment, only the user contributed content is being scanned as forums may include multimedia content that is included in the forum itself and thus would not assist a user in identifying which pages include sought after multimedia content. For example, the forum may include icons for new posts and replies.

In process 210, media program 115 compares the identified metadata with the entries included in references 116 and attempts to identify a match. For example, media program 115 identifies a link in a post that ends in .JPG, i.e., metadata A. Media program 115 accesses the entries included in references 116 and matches metadata A to an entry that indicates that an image file is included with the post. For example, media program 115 identifies an embedded file in a post that ends in .MP4, i.e., metadata B. Media program 115 accesses the entries included in references 116 and matches metadata B to an entry that indicates that a video file is included with the post.

In determination process 215, media program 115 determines whether the identified metadata matches an entry included in references 116. If the identified metadata does not match an entry included in references 116 (decision process 215, no branch), then media program 115 proceeds to process 220. In general, if the metadata does not match an entry in references 116 then that metadata does not correspond to multimedia content. If the identified metadata does match an entry included in references 116 (decision process 215, yes branch), then media program 115 proceeds to decision process 230.

In process 220, media program 115 identifies the type of multimedia content that is included in the post. The identification is based on the match between the metadata and the entry included in references 116.

In process 225, media program 115 flags the page of posts based on the identified type of multimedia content that is included in the post. The flag indicates that an indicator, such as an icon, is to be added during pagination to indicate that the page includes the identified type of multimedia content.

In decision process 230, media program 115 determines whether more posts exist, i.e., whether another set of posts, which have not been processed, exist. If more posts do exist (decision process 230, yes branch), then media program 115 proceeds to process 205. If more posts do not exist (decision process 230, no branch), then media program 115 prepares the information for online display in process 235.

In process 235, media program 115 paginates the set of posts, includes the indicator to indicate that the page includes the identified type of multimedia content, and saves the now paginated information as part of paginated data 117. For example, a paginated set of information generated by media program 115 includes a superscript icon (i, v or a) that is attached to the respective page number of the set of posts as a superscript. The inclusion of i, v or a as a superscript of a page number indicates that the page respectively includes images (i), video (v) or audio (a) multimedia content.

In certain embodiments, media program 115 is configured to add indicators to content that has already been paginated. In such embodiments, media program 115 scans the contents of those pages and adds indicators based on identified multimedia content.

In certain embodiments, media program 115 utilizes a pop-up icon that appears when a cursor hovers over a page number of paginated information for a predetermined period of time. In such embodiments, the pop-up icon includes an indication of the multimedia content of at least one of the pages. In yet another embodiment, media program 115 is configured to sort paginated information based on the multimedia content included in those pages.

Figure 3:
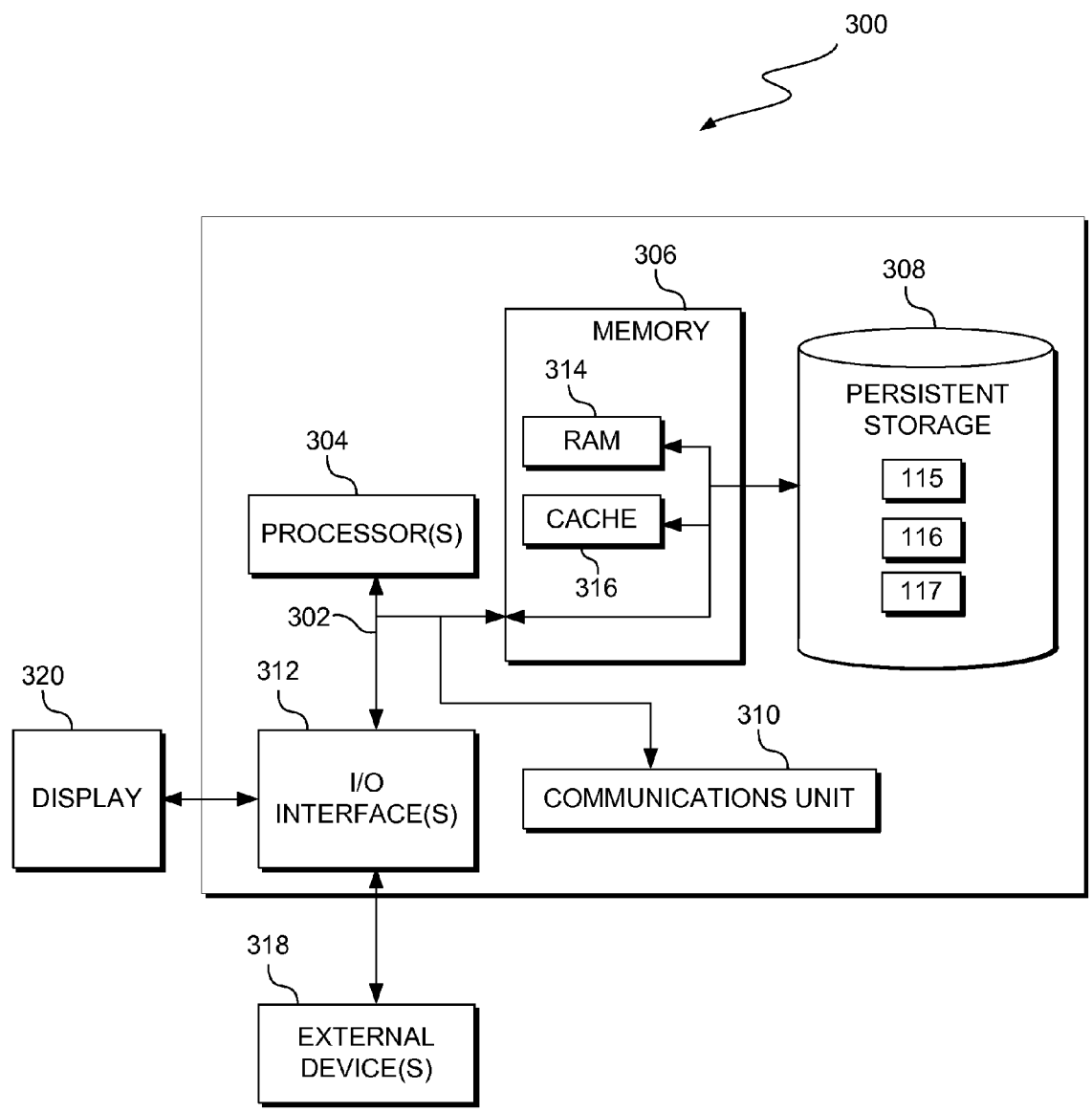
FIG. 3 depicts a block diagram of components of the computing device executing a media program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Media program 115, references 116 and paginated data 117 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Media program 115, references 116 and paginated data 117 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., media program 115, references 116 and paginated data 117, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for indicating the presence of multimedia content, the method comprising:
    determining, by one or more processors, whether metadata is included in a body of content;
    responsive to a determination that metadata is included in the body of content, determining, by the one or more processors, whether the metadata indicates that multimedia content is included in the body of content;
    responsive to a determination that the metadata indicates multimedia content is included in the body of content, flagging, by the one or more processors, each portion of the body of content that includes the multimedia content to denote that a portion of the body of content includes the multimedia content;
    paginating, by the one or more processors, the body of content into one or more pages designated by one or more page numbers; and
    indicating each flagged portion of the body of content with a corresponding one of the one or more page numbers.

2. The method of claim 1, wherein the step of determining, by one or more processors, whether metadata is included in a body of content further comprises:
    scanning, by one or more processors, the body of content, wherein the scanning only traverses content that is contributed by participants of the body of content.

3. The method of claim 1, wherein the step of determining, by one or more processors, whether the metadata indicates multimedia content is included in the body of content comprises:
    comparing, by one or more processors, a content included in the body of content with a set of references, wherein a match between the content and an entry in the set of references indicates the presence of multimedia content.

4. The method of claim 3, wherein the set of references is updated on a predetermined schedule such that entries for a plurality of types of multimedia content are maintained such that a comparison between the content included in the body of content with such entries results in the identification of multimedia content included in the body of content.

5. The method of claim 1, wherein the step of determining, by one or more processors, whether the metadata indicates multimedia content is included in the body of content further comprises:
   determining, by one or more processors, whether one or both of a link or an embedded element that are included in the body of content include a multimedia element.

6. The method of claim 1, wherein the body of content is unprocessed information stored in a database.

7. The method of claim 1, wherein the one or more pages are presented as online content.

8. The method of claim 1, wherein paginating the body of content further comprises:
   generating, by one or more processors, a table of contents, wherein the table of contents includes at least one of the at one or more page numbers and a character corresponding to each page of the one or more pages.

9. The method of claim 1, further comprising displaying a visible cue, such that an amount of time required to complete a search for multimedia content is reduced, and wherein the search is conducted by a user of the one or more pages.

\* \* \* \* \*